Sept. 7, 1926.
F. H. GRANT
ARTIFICIAL TOOTH
Filed Feb. 9, 1925
1,598,816
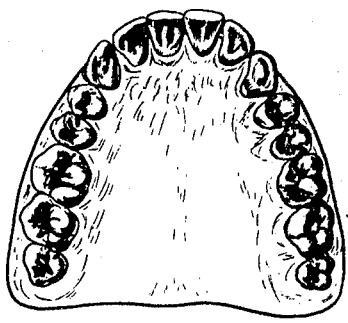
Fig. 1. Fig. 2.
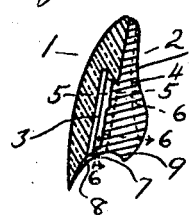 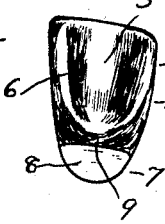 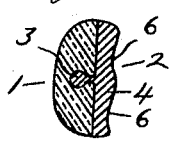 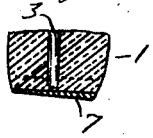
Fig. 3. Fig. 4. Fig. 5. Fig. 6.
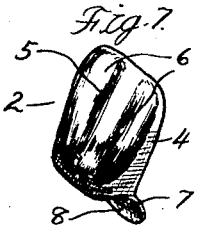  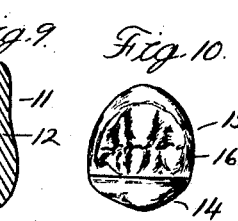 
Fig. 7. Fig. 8. Fig. 9. Fig. 10. Fig. 11.
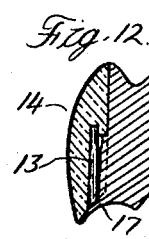  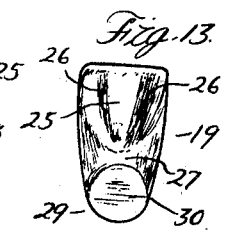 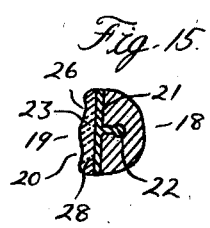
Fig. 12. Fig. 14. Fig. 13. Fig. 15.
 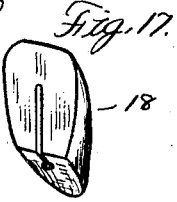
Fig. 16. Fig. 17.
Inventor
Francis H. Grant.
By Whittemore, Hulbert & Whittemore & Belknap
Attorneys Patented Sept. 7, 1926.

1,598,816

UNITED STATES PATENT OFFICE.

FRANCIS H. GRANT, OF DETROIT, MICHIGAN, ASSIGNOR TO GRANT DENTAL MANUFACTURING COMPANY, OF DETROIT, MICHIGAN, A CORPORATION OF MICHIGAN.

ARTIFICIAL TOOTH.

Application filed February 9, 1925. Serial No. 8,020.

The invention relates to artificial teeth and has for its main object the manufacture of standardized artificial restorations in which are reproduced the surfaces of the natural teeth essential to mastication and distribution of the food and enunciation. Another object is the provision of standardized backings reproducing the natural surfaces essential to mastication and distribution of the food and enunciation and engageable by standardized interchangeable facings corresponding in form and size to the backings. Further objects are the provision of standardized backings having external surfaces shaped to protect the gums; the provision of standardized backings having anatomically shaped occlusal surfaces and means at their inner ends for engaging the inner ends of the facings and covering the joints between the facings and backings to protect the same; and the provision of standardized backings having portions at their inner ends shaped to fit the gum.

With these as well as other objects in view, the invention resides in the novel features of construction and combinations and arrangements of parts as more fully hereinafter set forth.

In the drawings:

Figures 1 and 2 are respectively a plan view and a front view of an upper dental arch.

Figure 3 is a longitudinal section through one of the artificial teeth embodying my invention.

Figure 4 is a rear elevation thereof.

Figures 5 and 6 are cross sections respectively on the line 5—5 and 6—6 of Figure 3.

Figures 7 and 8 are perspective views respectively of the backing and facing of the artificial tooth of Figures 3 to 6, inclusive.

Figure 9 is a longitudinal section through a modified tooth.

Figures 10, 11 and 12 are respectively a plan view of, a rear view of, and a longitudinal section through another artificial tooth;

Figures 13, 14 and 15 are respectively a rear view of and longitudinal and transverse sections through a modified artificial tooth.

Figures 16 and 17 are perspective views respectively of the backing and facing of the modified artificial tooth.

1 is the artificial tooth facing of the standardized interchangeable type. This facing is manufactured in a number of different standardized forms and sizes classified according to the forms and sizes of each natural tooth. 2 is the artificial tooth backing which is also made in a number of different forms and sizes classified according to the forms and sizes of each natural tooth. This backing is a complete unit and is engageable by the facing corresponding thereto in form and size and forms with the facing an artificial tooth of the approximate size and within the limits of the replaced natural tooth. The facing is formed of a suitable material such as porcelain or the like and the backing is formed of a suitable material such as gold, gold alloy or the like. The backing is preferably forged from a metal ingot by cooperating dies which during the swaging operation cause the metal to flow and to thereby produce a backing which is more dense and strong than a cast backing and which has a surface with a natural polish, which is not true of a cast backing.

For interchangeably securing the facing 1 to the backing 2 I have provided the backing with the integral rib 3 which is formed during the forging operation. This rib extends longitudinally of the body 4 of the backing and is located upon its inner or facing bearing surface. The rib has an enlarged cylindrical or barrel portion at its edge and a web portion between this cylindrical or barrel portion and the inner surface of the backing body for engaging in correspondingly shaped recesses in the facing. The facing may be secured to the backing by a rectilinear movement, the inner surface of the backing body and the surface of the facing contacting therewith preferably extending in parallel planes, and the cylindrical or barrel portion of the rib preferably extending parallel to the inner surface of the backing body.

The portion of the backing body 4 having the surfaces corresponding to those of the natural tooth essential to mastication and distribution of the food and also enunciation is anatomically shaped. These surfaces are designated in the present instance the primary external surface and comprise the occlusal surface 5 which has formed therein the grooves 6 of the natural tooth.

Another feature of my invention resides in forming the backing 2 with the transverse outwardly extending lip 7 integral with and extending from the inner end of the backing body 4, this lip also being formed during the forging operation. The lip extends obliquely and its facing bearing surface preferably is curved to contact with the inner end of the facing throughout substantially its entire area. The opposite or gingival surface 8 of the lip is shaped to fit the gum by making the same concave and also preferably inclined. This lip forms the complete inner portion of the artificial tooth backing and completely protects the joint between the facing and backing whereby collection of food in the joint and erosion of the cement or the like for securing the facing to the backing are avoided.

It will be noted from inspection of Figs. 1 and 2 that the thickness of each natural tooth varies and that the height of the gum also varies throughout its extent. With the central artificial tooth shown in Figs. 1 to 8, inclusive, the body 4 of the backing, as shown particularly in Fig. 5 has a mesial edge which is thinner than the distal edge. Also the transverse lip 7 of the same backing has a progressively increasing thickness transversely thereof from the mesial edge to the distal edge so that the gingival surface of the lip will contact with the gum throughout the width of the lip and at the same time the opposite surface of the lip will extend at right angles to the longitudinal axis of the backing to contact with the inner end of the facing.

To protect the gum the secondary portion 9 of the lingual surface of the backing between the gum and the ridge at the inner edge of the occlusal surface preferably recedes from the normal anatomical shape so that the area of the gum covered by the backing is decreased and the food will be given a better chance of leaving the artificial tooth and bridging the gap between the gum and backing so that packing of the food between the artificial tooth and gum will be more likely avoided.

Figure 9 illustrates a modified artificial tooth which as shown is also a central. This artificial tooth comprises the standardized interchangeable facing 10 and the forged standardized backing 11 having the body 12 with an anatomically shaped primary external surface and a receding secondary lingual surface portion, the facing and backing being secured to each other by the longitudinally extending rib 13 upon the backing engaging in the facing. The arrangement and construction of the facing and body are the same as the artificial tooth previously described with the exception that the transverse outwardly extending lip at the inner end of the body is omitted and the inner end of the body itself is shaped to fit the gum.

In the artificial tooth shown in Figures 10, 11 and 12 I have illustrated a bicuspid which comprises the standardized interchangeable facing 14 and the forged standardized backing 15 secured to each other in the same manner as the facings and backings previously described. Also the backing has the body 16 with an anatomically shaped primary external surface and a receding secondary lingual surface portion and the transverse outwardly extending lip 17 shaped to fit the gum. In fact this artificial tooth embodies all of the features of the artificial tooth shown in Figures 3 to 8, inclusive, the only difference being in the difference in teeth.

In the modified artificial tooth shown in Figures 13, 14, 15, 16 and 17, 18 is the standardized interchangeable facing and 19 the standardized backing. This backing comprises the auxiliary backing 20 and the main backing 21. The main backing as shown is a flat plate preferably formed by a stamping operation and having the longitudinally extending rib 22 which has a web terminating in a cylindrical or barrel portion, the web and cylindrical or barrel portion being engageable in correspondingly shaped recesses in the facing. The auxiliary backing is preferably formed of a forging and has a recess in the inner surface of its body 23 which is engageable with a projection 24 upon the main backing for assisting in positioning and securing the main and auxiliary backings to each other. The external surface of the auxiliary backing corresponding to that of the natural tooth essential to mastication and distribution of food and also enunciation, or the primary external surface, 25 is anatomically shaped, it having grooves 26 therein corresponding to those in the external surface of the original tooth replaced by the artificial tooth. The secondary portion 27 of the lingual surface of the backing between the gum and the ridge at the inner edge of the occlusal surface preferably recedes from the normal anatomical shape to decrease the area of the gum covered by the backing and to give the food a better chance to leave the backing so that it will not pack in between the backing and the gum.

The auxiliary backing 20 is preferably provided with a layer of solder 28 upon its inner surface for facilitating the securing of the auxiliary backing upon the main backing. By heating the solder upon the auxiliary backing sufficiently to melt the solder and pressing the two backings together while the solder is in molten condition and allowing the same to cool the auxiliary backing is readily secured to the main backing. The heat required to melt this solder will not damage the auxiliary backing.

The auxiliary backing 20 is also preferably provided with the transverse outwardly extending lip 29 at the inner end of the body 23, and integral therewith, this lip having a length preferably to extend practically completely under the facing 18 and also having its outer surface inclined away from the body 23 at the same angle as the inner end of the facing and curved to contact therewith. The opposite or gingival surface 30 is shaped to fit the gum, this surface being made concave and also inclined relative to the outer surface of the lip transversely of this lip to compensate for the longitudinal inclination of the gum. With this arrangement the lip properly engages the gum and at the same time the joint between the main backing and the facing is completely protected at its inner end and as a consequence collection of food in the joint as well as washing out of the securing means for the facing are avoided.

From the above description it will be readily seen that I have provided a standardized backing reproducing the natural surfaces essential to mastication and distribution of the food and enunciation and engageable by standardized interchangeable facings corresponding in form and size to the backing. It will also be seen that I have provided a hardened and naturally polished backing which is a decided advance in the dental art, where it has been the usual practice to either cast or solder backings. Furthermore, it will be seen that the dentist is assured of uniform results each time he applies one of my backings.

What I claim as my invention is:

1. The combination with a standardized interchangeable facing, of an article of manufacture comprising a forged standardized backing having an anatomically shaped external surface, and means for securing said facing to said backing to form an artificial tooth within the limits of the replaced natural tooth.

2. The combination with a standardized interchangeable facing, of an article of manufacture comprising a forged standardized backing having an anatomically shaped external surface, said backing being constructed to form a support and to cooperate with said facing to form an artificial tooth within the limits of the replaced natural tooth.

3. The combination with a standardized interchangeable facing, of an article of manufacture comprising a forged standardized backing having a hardened and naturally polished anatomically shaped external surface and means upon the inner surface of said backing for engagement with said facing by a rectilinear movement of the latter relative to and longitudinally of the former.

4. An article of manufacture comprising a forged standardized backing for use with a standardized interchangeable facing and having an anatomically shaped external surface, said backing being constructed to form a support and to cooperate with said facing to form an artificial tooth within the limits of the replaced natural tooth, and cooperative means upon said backing and facing for securing the latter to the former by a longitudinal movement of the latter relative to the former.

5. An article of manufacture comprising a forged standardized backing for use with a standardized interchangeable facing and having an anatomically shaped external surface and an inner surface extending in a plane for engagement with said facing and also a transverse outwardly extending lip at its inner end for engagement with the inner end of said facing to protect the joint between said backing and facing, said backing being constructed to form with said facing an artificial tooth within the limits of the replaced natural tooth.

6. An article of manufacture comprising a forged standardized backing for use with a standardized interchangeable facing and having an anatomically shaped external surface, said backing being constructed to form a support for said facing and to cooperate with said facing to form an artificial tooth within the limits of the replaced natural tooth, and means including a longitudinally extending rib upon the inner surface of said backing for attaching said facing to said backing by a relative rectilinear movement.

7. An article of manufacture comprising a forged standardized backing for use with a standardized interchangeable facing and having an anatomically shaped external surface, said backing being constructed to form a support and to cooperate with said facing to form an artificial tooth within the limits of the replaced natural tooth, cooperating means upon said backing and facing for securing the latter to the former by a longitudinal movement of the latter relative to the former, and means upon said backing and extending adjacent to the inner end of said facing for protecting the joint between said facing and said backing.

8. The combination with a standardized interchangeable facing, of an article of manufacture comprising a forged standardized backing having an anatomically shaped external surface, and a longitudinally extending rib upon the opposite surface for attachment to said facing.

9. An article of manufacture comprising a forged standardized backing for use with a standardized interchangeable facing and having an anatomically shaped external surface, and a transverse outwardly extending lip at its inner end engageable with the inner end of said facing for protecting the joint between said backing and facing, said backing being constructed to form a support for said facing and to cooperate with said facing to form an artificial tooth within the limits of the replaced natural tooth, and a longitudinally extending rib upon said backing for attachment with said facing by a rectilinear movement of the latter.

10. In an artificial tooth, the combination with a standardized interchangeable facing, of an article of manufacture comprising a forged standardized backing having an anatomically shaped external surface and a transversely extending lip at its inner end for engaging the inner end of said facing and covering the joint between said facing and backing and forming the complete inner portion of the artificial tooth.

11. An article of manufacture comprising a forged standardized backing for use with a standardized interchangeable facing and having an anatomically shaped external surface and a transverse outwardly extending lip at its inner end engageable with the inner end of said facing for protecting the joint between said backing and facing, said lip having a thickness which increases from its mesial to its distal edges and means upon the inner surface of said backing including an integral longitudinally extending rib for engagement with said facing by a rectilinear movement of the latter relative to and longitudinally of the former.

In testimony whereof I affix my signature.

FRANCIS H. GRANT.